United States Patent
Aboulnaga et al.

(10) Patent No.: US 9,594,783 B2
(45) Date of Patent: *Mar. 14, 2017

(54) INDEX SELECTION FOR XML DATABASE SYSTEMS

(75) Inventors: Ashraf Aboulnaga, Waterloo (CA); Andrey Balmin, San Jose, CA (US); Kevin S. Beyer, San Francisco, CA (US); Iman Elghandour, Alexandria (EG); Fei Yen Chiang, Toronto (CA); Daniele Costante Zilio, Georgetown (CA); Calisto Paul Zuzarte, Pickering (CA)

(73) Assignee: International Business Machines Corporation, Armonk, NY (US)

(*) Notice: Subject to any disclaimer, the term of this patent is extended or adjusted under 35 U.S.C. 154(b) by 855 days.

This patent is subject to a terminal disclaimer.

(21) Appl. No.: 13/536,343

(22) Filed: Jun. 28, 2012

(65) Prior Publication Data

US 2013/0080441 A1 Mar. 28, 2013

Related U.S. Application Data

(63) Continuation of application No. 11/849,196, filed on Aug. 31, 2007, now Pat. No. 8,229,920.

(51) Int. Cl.
*G06F 17/30* (2006.01)
(52) U.S. Cl.
CPC .. *G06F 17/30312* (2013.01); *G06F 17/30911* (2013.01); *G06F 17/30935* (2013.01)
(58) Field of Classification Search
CPC ......... G06F 17/30312; G06F 17/30911; G06F 17/30935; G06F 17/30545; G06F 17/30321; G06F 17/30595; G06F 17/30923; G06F 17/30336; G06F 17/30442; G06F 17/30448
See application file for complete search history.

(56) References Cited

U.S. PATENT DOCUMENTS

| | | | |
|---|---|---|---|
| 6,539,396 B1 | 3/2003 | Bowman-Amuah |
| 7,260,572 B2 | 8/2007 | Min et al. |
| 7,478,375 B1 | 1/2009 | Kersters |
| 7,493,305 B2 | 2/2009 | Thusoo et al. |

(Continued)

OTHER PUBLICATIONS

Iman Elghandour, et al. "XML Index Recommendation with Tight Optimizer Coupling" VLDB Endowment, Sep. 2007, pp. 1-12.

(Continued)

*Primary Examiner* — Christyann Pulliam
*Assistant Examiner* — Rezwanul Mahmood
(74) *Attorney, Agent, or Firm* — Janaki K. Davda; Konrad, Raynes, Davda & Victor LLP

(57) ABSTRACT

A method, computer-implemented system, and computer program product for creating indexes over XML data managed by a database system are provided. The method, computer-implemented system, and computer program product provide for receiving a workload for the XML data, the workload including one or more database statements, utilizing an optimizer of the database system to enumerate a set of one or more path expressions by creating a virtual universal index based on the workload received and matching a path expression to the virtual universal index, and recommending one or more path expressions from the set of one or more candidate path expressions to create the indexes over the XML data.

20 Claims, 6 Drawing Sheets

(56) References Cited

U.S. PATENT DOCUMENTS

| | | | |
|---|---|---|---|
| 7,499,915 B2 | 3/2009 | Chandrasekar et al. | |
| 7,512,615 B2 | 3/2009 | Bordawekar et al. | |
| 7,664,774 B2 | 2/2010 | Agrawal et al. | |
| 7,769,744 B2* | 8/2010 | Waas et al. | 707/711 |
| 7,921,101 B2 | 4/2011 | Murthy et al. | |
| 8,108,436 B2 | 1/2012 | Chhatrapati et al. | |
| 8,229,920 B2 | 7/2012 | Aboulnaga et al. | |
| 2003/0225768 A1* | 12/2003 | Chaudhuri | G06F 17/30595 707/999.01 |
| 2004/0002957 A1* | 1/2004 | Chaudhuri | G06F 17/30595 707/999.002 |
| 2004/0003004 A1* | 1/2004 | Chaudhuri | G06F 17/30312 707/999.2 |
| 2004/0064693 A1 | 4/2004 | Pabla et al. | |
| 2004/0098384 A1 | 5/2004 | Min et al. | |
| 2004/0167904 A1* | 8/2004 | Wen | G06F 17/30914 707/999.1 |
| 2004/0260684 A1* | 12/2004 | Agrawal | G06F 17/30312 707/999.003 |
| 2004/0267719 A1* | 12/2004 | Doherty | G06F 17/30448 707/999.003 |
| 2005/0004935 A1 | 1/2005 | Thede | |
| 2005/0050016 A1* | 3/2005 | Stanoi | G06F 17/30917 707/999.003 |
| 2005/0091188 A1 | 4/2005 | Pal et al. | |
| 2005/0102256 A1 | 5/2005 | Bordawekar et al. | |
| 2005/0198055 A1 | 9/2005 | Mihaila et al. | |
| 2005/0203933 A1 | 9/2005 | Chaudhuri et al. | |
| 2005/0203940 A1* | 9/2005 | Farrar | G06F 17/30321 707/999.102 |
| 2005/0228791 A1 | 10/2005 | Thusoo et al. | |
| 2005/0228792 A1 | 10/2005 | Chandrasekaran et al. | |
| 2006/0036989 A1* | 2/2006 | Chaudhuri | G06F 17/30312 717/101 |
| 2006/0053122 A1* | 3/2006 | Korn | G06F 17/30914 707/999.1 |
| 2006/0085378 A1* | 4/2006 | Raizman | G06F 17/30312 707/999.001 |
| 2006/0085484 A1* | 4/2006 | Raizman | G06F 17/30336 707/999.2 |
| 2006/0184551 A1 | 8/2006 | Tarachandani et al. | |
| 2006/0242102 A1* | 10/2006 | Bruno | G06F 17/30312 707/999.001 |
| 2007/0016604 A1* | 1/2007 | Murthy | G06F 17/30911 707/999.102 |
| 2007/0043696 A1* | 2/2007 | Haas | G06F 17/30935 707/999.002 |
| 2007/0192280 A1* | 8/2007 | Agrawal | G06F 17/30587 707/999.002 |
| 2007/0299834 A1 | 12/2007 | Liu et al. | |

OTHER PUBLICATIONS

Balmin, A., et al. "Cost-based optimization in DB2 XML" IBM Systems Journal, vol. 45, No. 2, 2006, pp. 299-319.

Gupta, A., et al. "Aggregate-Query Processing in Data Warehousing Environments" Proceedings of the 21st FLDB Conference, 1995, 12 pages.

Valentin "DB2 Advisor: An Optimizer Smart Enough to Recommend it's own Indexes" 2000, Proceedings, 16th International Conference of Data Engineering, pp. 101-110.

Lightstone et al. "Toward Autonomic Computing with DB2 Universal database" Sep. 2002, SIGMOD Record, vol. 31, No. 3, pp. 1-7.

Elghandour et al. "XML Index Recommendation with Tight Optimizer Coupling" Jul. 11, 2007, Technical Report CS-2007-22, pp. 1-20.

Haw et al. "Query Optimization Techniques for XML Databases" Jan. 28, 2005, International Journal of Information and Communication Engineering, pp. 1-8.

ACM, "XML Index Recommendation with Tight Optimizer Coupling", ACM SIGMOD, Nov. 19, 2006, Total 12 pp.

Balmin et al., "XML Index Recommendation with Tight Optimizer Coupling", VLDB '07, Sep. 23-28, 2007, Vienna, Austria, Copyright 2007 VLDB Endowment, ACM 9781595936493, Total 12 pp.

Office Action 1, Apr. 30, 2010, for U.S. Appl. No. 11/849,196, filed Aug. 31, 2007, by A. Aboulnaga et al., Total 36 pp.

Response to Office Action 1, Aug. 27, 2010, for U.S. Appl. No. 11/849,196, filed Aug. 31, 2007, by A. Aboulnaga et al., Total 19 pp.

Final Office Action, Nov. 16, 2010, for U.S. Appl. No. 11/849,196, filed Aug. 31, 2007, by A. Aboulnaga et al., Total 38 pp.

Response to Final Office Action, Feb. 16, 2011, for U.S. Appl. No. 11/849,196, filed Aug. 31, 2007, by A. Aboulnaga et al., Total 17 pp.

Office Action 3, Dec. 22, 2011, for U.S. Appl. No. 11/849,196, filed Aug. 31, 2007, by A. Aboulnaga et al., Total 37 pp.

Response to Office Action 3, Feb. 10, 2012, for U.S. Appl. No. 11/849,196, filed Aug. 31, 2007, by A. Aboulnaga et al., Total 17 pp.

Notice of Allowance, Mar. 13, 2012, for U.S. Appl. No. 11/849,196, filed Aug. 31, 2007, by A. Aboulnaga et al., Total 13 pp.

U.S. Appl. No. 11/849,196, filed Aug. 31, 2007, entitled "Index Selection for XML Database Systems", invented by A. Aboulnaga et al., Total 46 pp.

\* cited by examiner

| C1 | /Security/Symbol | string |
| C2 | /Security/SecInfo/*/Sector | string |
| C3 | /Security/Yield | numerical |

700

| | |
|---|---|
| 1 | ($p_1$.next = null AND $p_1$.pred = null ) OR ($p_2$.next = null AND $p_2$.pred = null ) return {genXPath} |
| 2 | isLeaf($p_1$.next) AND isLeaf($p_2$.next) return generalizeStep(genXPath, $p_1$.next, $p_2$.next) |
| 3 | isLeaf($p_1$.next) AND ! isLeaf($p_2$.next) $p_2L$ ← last step in $p_2$ expression. genXPath ← genXPath appended to it /∗ return generalizeStep(genXPath, $p_1$.next, $p_2L$) |
| 4 | ! isLeaf($p_1$.next) AND isLeaf($p_2$.next) $p_1L$ ← last step in $p_2$ expression. genXPath ← genXPath appended to it /∗ return generalizeStep(genXPath, $p_1L$, $p_2$.next) |
| 5 | ($p_1$.next ≠ null ) AND ($p_2$.next ≠ null ) AND $p_1$.next ≠ $p_2$.next $p_1n$ ← first occurrence of root node of $p_2$ in $p_1$ $p_2n$ ← first occurrence of root node of $p_1$ in $p_2$ return {generalizeStep(genTree, $p_1n$, $p_2$) , generalizeStep(genTree, $p_1$, $p_2n$)} |

| | | |
|---|---|---|
| C4 | /Security//* | string |
| C5 | /Security/* | numerical |

FIG. 8

INDEX SELECTION FOR XML DATABASE SYSTEMS

CROSS-REFERENCE TO RELATED APPLICATIONS

Under 35 U.S.C. §120 the present application is a continuation of U.S. patent application Ser. No. 11/849,196, filed Aug. 31, 2007, entitled "INDEX SELECTION FOR XML DATABASE SYSTEMS," which is incorporated herein by reference.

FIELD OF THE INVENTION

The present invention relates generally to selection of indexes for XML database systems.

BACKGROUND OF THE INVENTION

XML database systems are expected to handle increasingly complex queries over increasingly large and highly structured XML databases. Having the correct indexes can significantly improve performance of such queries. Although some XML database systems will employ indexes to improve query performance, deciding which indexes to create may be problematic.

SUMMARY OF THE INVENTION

A method, computer-implemented system, and computer program product for creating indexes over XML data managed by a database system are provided. The method, computer-implemented system, and computer program product provide for receiving a workload for the XML data, the workload including one or more database statements, utilizing an optimizer of the database system to enumerate a set of one or more path expressions by creating a virtual universal index based on the workload received and matching a path expression to the virtual universal index, and recommending one or more path expressions from the set of one or more candidate path expressions to create the indexes over the XML data.

BRIEF DESCRIPTION OF THE DRAWINGS

The accompanying figures illustrate several embodiments of the invention and, together with the description, serve to explain the principles of the invention. One of ordinary skill in the art readily recognizes that the particular embodiments illustrated in the accompanying figures are merely exemplary, and are not intended to limit the scope of the present invention.

FIG. 7 depicts a table with a set of rules used by an algorithm according to an implementation of the invention.

FIG. 8 illustrates a table listing generalized candidate index patterns for sample queries according to an implementation of the invention.

DETAILED DESCRIPTION

Figure 1:
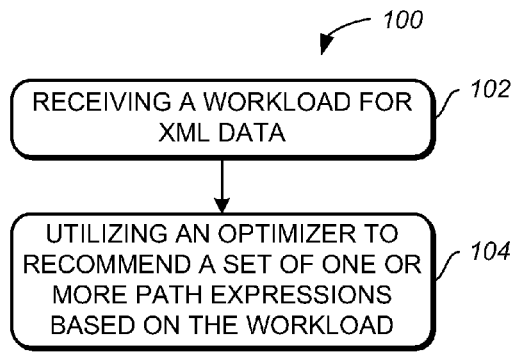
FIG. 1 depicts a process for selecting indexes to be created over XML data according to an implementation of the invention.

The present invention generally relates to selection of indexes for XML database systems. The following description is presented to enable one of ordinary skill in the art to make and use the invention and is provided in the context of a patent application and its requirements. Various modifications to the described embodiments and the generic principles and features described herein will be readily apparent to those skilled in the art. Thus, the present invention is not intended to be limited to the embodiments shown but is to be accorded the widest scope consistent with the principles and features described herein.

Selection of indexes is an important part of any database system design as indexes can significantly impact workload performance by enabling quicker and more efficient access to data. Determining which indexes are suitable for XML database systems is now increasingly important because XML is becoming the standard language in which data are represented and exchanged.

XML, which stands for eXtensible Markup Language, is a software language that can be used to label information from diverse data sources. XML database systems may be systems that only support XML data or may be systems that support XML and other types of data (e.g., relational data). Index selection for other types of data, such as relational data, differs from index selection for XML data because with XML data, a variety of index types (e.g., structural, value, and so forth) may be needed. Additionally, the structure of XML data may be more complex. XML indexes also differ from regular indexes in that not only do they define the data type and column to index but also an XML pattern within the XML column to index for values indexes.

Further, some database systems may permit partial indexing of data. For instance, an XML database system may allow an index to be created for a portion of an XML document that matches an index pattern. The index pattern may be expressed as a path expression (e.g., '//people/person/homepage') such that only the XML elements reachable by the path expression are included in the index.

Partial indexing leads to smaller indexes that only include portion(s) of document(s) that are useful. Index maintenance is also more efficient with partial indexing. Additionally, index lookup performance is improved over indexes on whole document(s). Selection of indexes, however, is further complicated because not only do decisions need to be made as to which type of indexes to create and which documents to index, decisions will also have to be made as to which portions of each document to index.

Solutions have been proposed to tackle the problems associated with selecting indexes for XML data. The proposed solutions, however, are completely independent of database system optimizers. As a result, there is no guarantee that any index selected will be used by an optimizer. In addition, there is no guarantee that the benefits of a selected index are accurately estimated. Some proposed solutions also do not attempt to select indexes that are useful for multiple queries, fail to take into account increased costs associated with updates, deletes, and inserts, and ignore system constraints (e.g., disk storage limits).

Depicted in FIG. 1 is a process 100 for selecting indexes to be created over XML data according to an implementation of the invention. At 102, a workload for the XML data is received. The workload includes one or more database statements. Database statements may be expressed using XQuery, which is a query language that can be used to query XML data. At 104, an optimizer is utilized to recommend a set of one or more path expressions to be used to create one or more indexes over the XML data based on the workload received. Path expressions may be expressed using XPath, which is a language that can be used to address parts of an XML document.

Process 100 may include additional process blocks (not shown) of creating one or more indexes over the XML data using the set of one or more path expressions recommended and storing the one or more indexes over the XML data in memory or on disk. An index may be viewed as providing an efficient mapping from one or more path expressions to XML elements that are reachable by the one or more path expressions. In one implementation, at least one of the one or more indexes to be created over the XML data is a partial index.

Indexes that are created may be structural indexes or value indexes. Structural indexes help in speeding up navigation through hierarchical structure of XML data and answering queries, such as, "/Security/Symbol", which is requesting all security symbols. Value indexes help in retrieving XML elements based on some condition of the value they contain and answering queries, such as, "/Security[Yield>=4.5]", which is requesting all securities with a yield greater than or equal to 4.5.

In one implementation, recommendation of the set of one or more path expressions is also based on one or more system constraints (e.g., disk space, schema, and so forth). Recommendation of the set of one or more path expressions may also take into account increased costs associated with update, delete, and insert (UDI) statements when one or more indexes are created using the set of one or more path expressions recommended.

Figure 2:
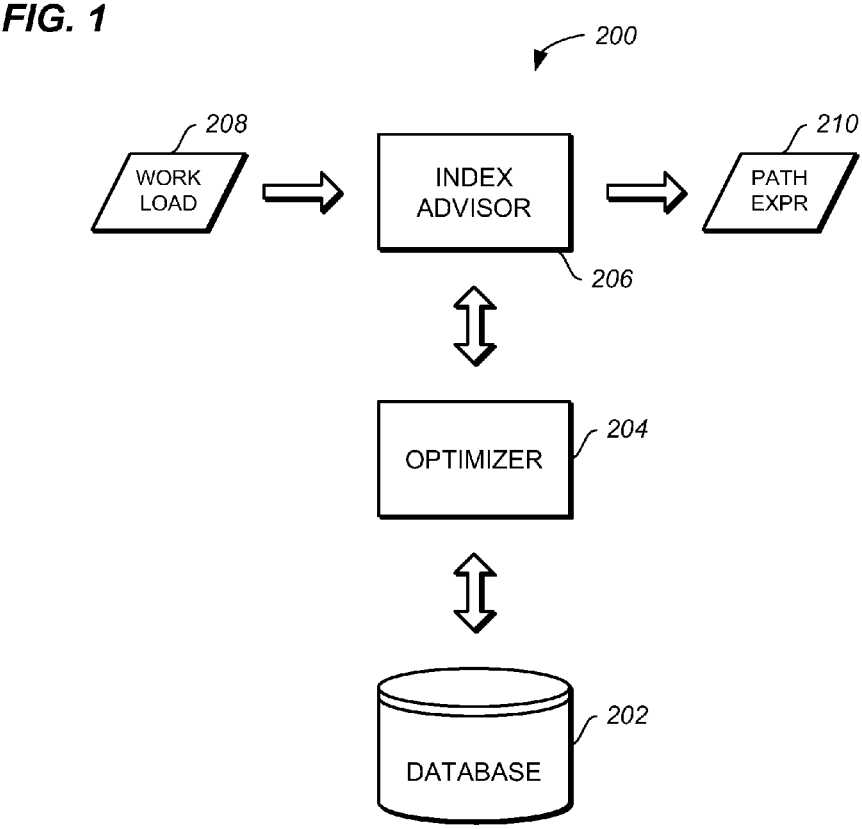
FIG. 2 illustrates a system for selecting indexes to be created over XML data according to an implementation of the invention.

FIG. 2 illustrates a system 200 for selecting indexes to be created over XML data according to an implementation of the invention. System 200 includes a database 202 that stores the XML data. In addition, system 200 includes an optimizer 204 in communication with database 202. Optimizer 204 optimizes database statements seeking access to the XML data stored in database 202. An index advisor 206 that is in communication with optimizer 204 is also included in system 200.

Although database 202, optimizer 204, and index advisor 206 are all part of system 200, each one may be remotely located from one another (e.g., on different computers, at different locations, or the like). In FIG. 2, a workload 208 is received by index advisor 206. Workload 208 includes one or more database statements. Index advisor 206 then uses optimizer 204 to recommend a set of one or more path expressions 210 based on the workload 208 received by index advisor 206. The set of one or more path expressions 210 can be used to create one or more indexes (not shown) over the XML data stored in database 202.

Figure 3:
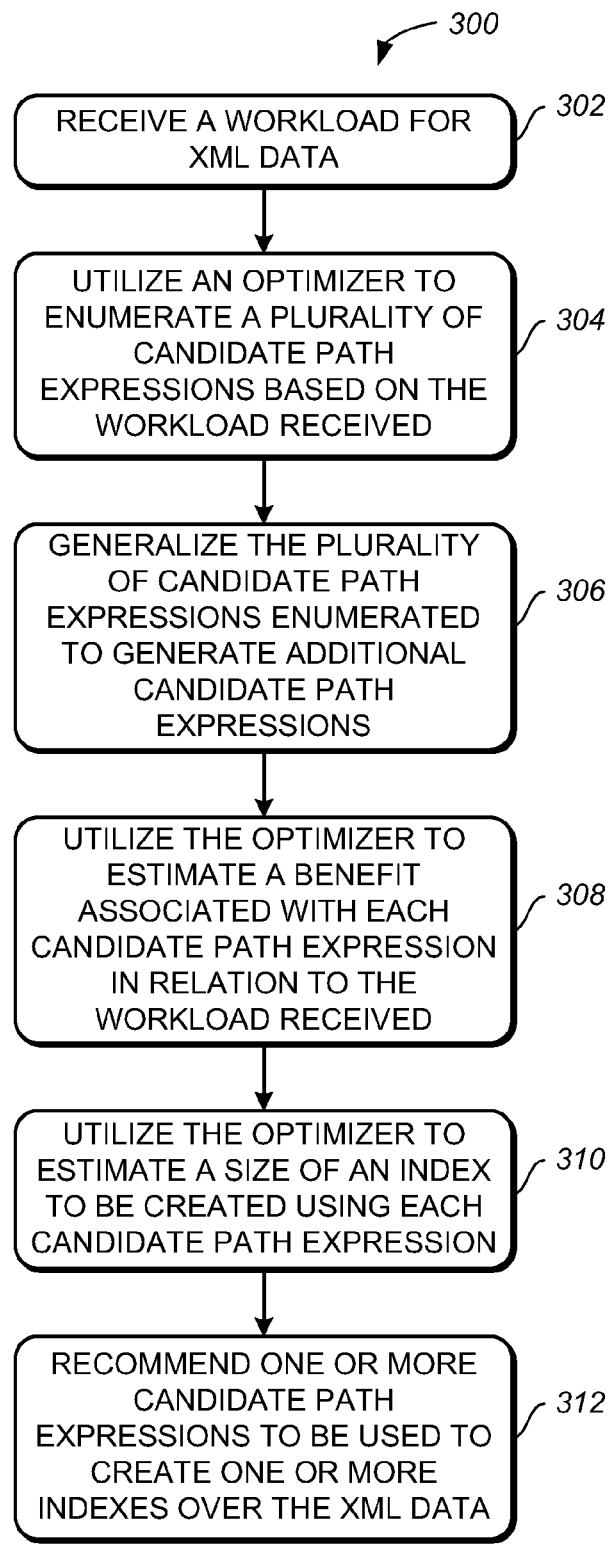
FIG. 3 shows a process for selecting indexes to be created over XML data according to an implementation of the invention.

Shown in FIG. 3 is a process 300 for selecting indexes to be created over XML data managed by a database system according to an implementation of the invention. At 302, a workload for the XML data, which includes one or more database statements, is received. At 304, an optimizer of the database system is utilized to enumerate a plurality of candidate path expressions based on the workload received. At 306, the plurality of candidate path expressions enumerated is generalized to generate additional candidate path expressions.

At 308, the optimizer is utilized to estimate a benefit associated with each candidate path expression in relation to the workload received. For each candidate path expression, the optimizer is also utilized to estimate a size of an index to be created using the respective candidate path expression at 310. At 312, one or more candidate path expressions are recommended for use in creating one or more indexes over the XML data.

Recommendation of the one or more candidate path expressions is based on at least one of a system constraint, the estimated size of the index to be created using each candidate path expression, and the estimated benefit associated with each candidate path expression. In addition, the recommendation may be based on interaction between the one or more candidate path expressions.

Figure 4:
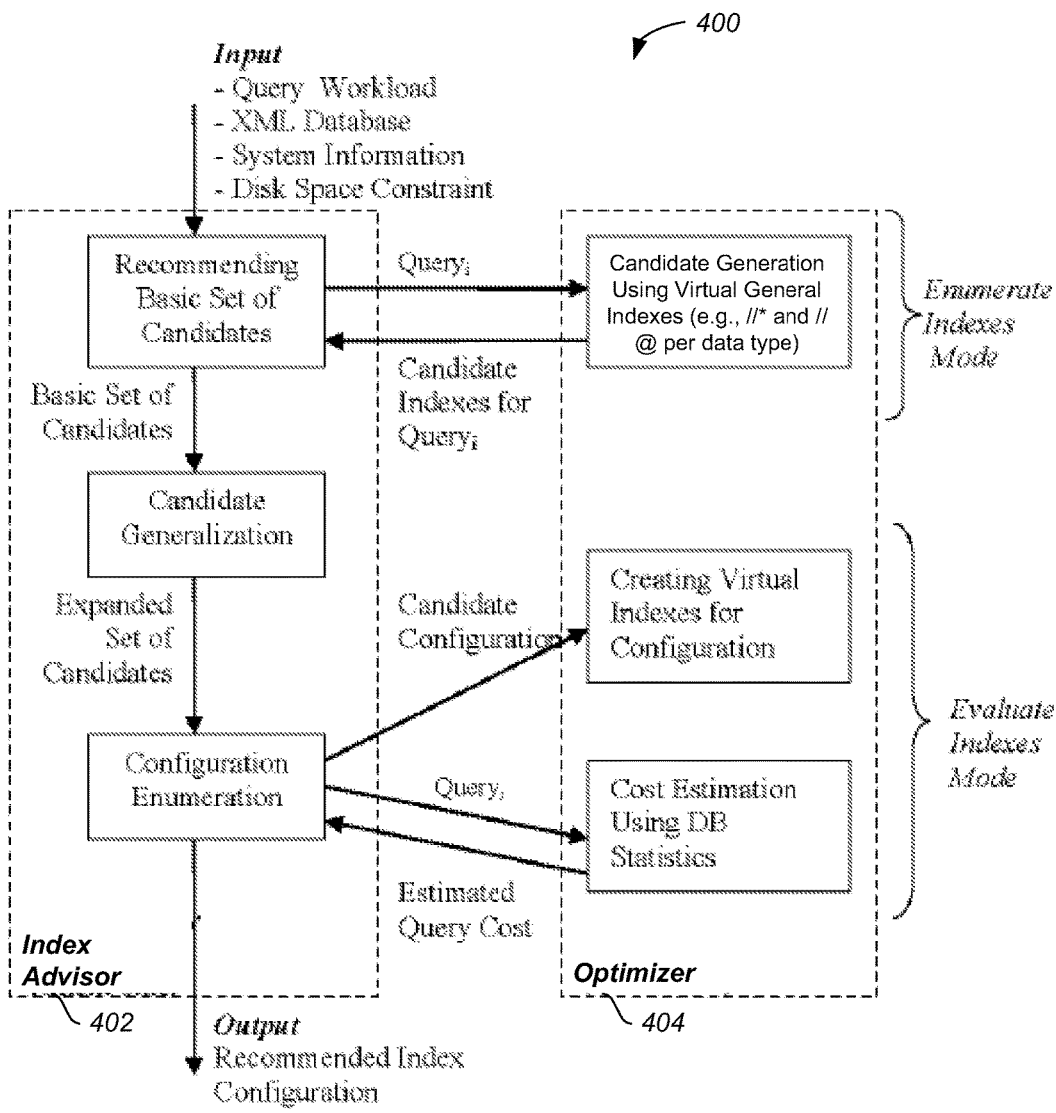
FIG. 4 depicts architecture of a system for selecting indexes to be created over XML data according to an implementation of the invention.

FIG. 4 depicts architecture of a system 400 for selecting indexes to be created over XML data according to an implementation of the invention. System 400 includes an index advisor 402 that is in communication with an optimizer 404. Optimizer 404 has two modes, an enumerate indexes mode and an evaluate indexes mode. In the enumerate indexes mode, optimizer 404 takes a query and generates index patterns (e.g., path expressions) that can be useful to the query. The index patterns can then be used to create indexes. In the evaluate indexes mode, optimizer 404 simulates an index configuration based on one or more index patterns and estimates the cost of a query under the index configuration. This mode also estimates the statistics for simulated indexes to allow the costing to be more accurate.

A high-level framework of an index recommendation process is as follows: First, index advisor 402 receives a query workload. For every query in the workload, optimizer 404 is relied upon to enumerate a set of candidate index patterns useful for the particular query, which can be used to create indexes. Next, index advisor 402 expands the set of candidate index patterns generated by optimizer 404 to include more general index patterns, each of which can potentially benefit multiple queries, either from the workload or from other workloads.

Finally, the space of possible index configurations is searched to find the optimal configuration, which maximizes the performance benefit to the workload while satisfying system constraints (e.g., disk space). The index recommendation process is described in more detail below in conjunction with the following sample queries:

```
Q1:
for $sec in
    SECURITY('SDOC')/Security
where $s/Symbol="BCIIPRC"
return $s
Q2:
for $sec in SECURITY('SDOC')/Security
where
    $sec/SecInfo/*/Sector="Energy" and
    $sec/Yield>4.5
return
    <Security> {$sec/Name} </Security>
```

Enumerating Candidates

According to an implementation of the invention, when an optimizer is used for index pattern enumeration, the optimizer creates and uses virtual indexes during the enumeration process. Virtual indexes are hypothetical indexes that are added to a database catalog and to all internal data structures of the optimizer, but are not physically created in memory or on disk and no data is inserted into them. Virtual indexes cannot be used for query execution.

The optimizer uses virtual indexes in conjunction with its index matching capabilities to assist an index advisor to enumerate candidate index patterns, which in turn, can be used to create candidate indexes. During an index matching process, the optimizer decides, for a current query being optimized, which of the available indexes can be used by the current query, and how can they be used (e.g., for which predicates in the query). Predicates matched to indexes can then be used as candidate index patterns.

By coupling the process of enumerating candidate index patterns in the index advisor with the process of index matching in the optimizer, indexes to be created based on the candidate index patterns enumerated by the index advisor are assured to be ones that can actually be matched and used by the optimizer. In addition, the functionality of index matching in the optimizer is leveraged so that there will be no need to replicate this functionality outside of the optimizer.

To leverage the index matching capabilities of the optimizer, one or more virtual universal or general indexes may be created over XML data (e.g., //* for a given XML column and data type, //@ for a given attribute, and so forth). These virtual general indexes virtually index all elements the XML data and hence can be matched with any path expression that can be answered using the index. The optimizer can then optimize a query with these virtual general indexes in place. After index matching, all path expressions in the query that are matched with a virtual general index are collected.

Every path expression, p, that matches a virtual general index will also match an index that is specific to it (e.g., an index created using path expression p). Essentially, the optimizer has answered the question: "If all possible indexes were available, which ones would be considered for this query?" As such, all path expressions matched with a virtual general index for a particular query will be the candidate path expressions for the particular query.

Figures 5, 6:
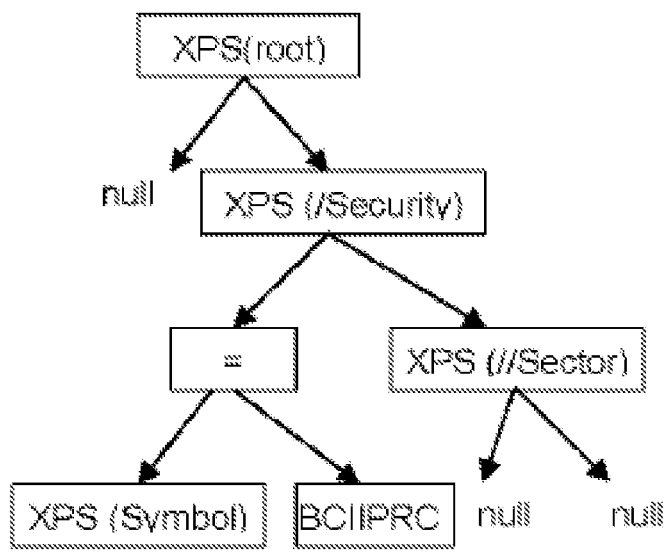
FIG. 5 illustrates a table listing enumerated candidate index patterns for sample queries according to an implementation of the invention.
FIG. 6 shows an example of an expression tree representing a path expression.

In one implementation, each candidate path expression and corresponding information (e.g., data type, full path expression, namespace declarations, and so forth) are recorded (e.g., in memory, on disk, or somewhere else). Illustrated in FIG. 5 is a table 500 that lists enumerated candidate index patterns for the two sample queries Q1 and Q2.

The candidate enumeration process allows the index matching capabilities of the optimizer to be leveraged, as well as, its query parsing, type checking, and query rewriting capabilities. Hence, the index advisor can support any query language supported by the optimizer (e.g., XQuery, SQL/XML, and so forth). The index advisor can also support any type checks or type casts that the optimizer performs when using an index, and it can enumerate any indexes that are only exposed by query rewrites in the optimizer.

A different virtual universal index may be created for each element, attribute, and/or data type in the XML data. Rather than creating a virtual universal index for each element, attribute, and/or data type in the XML data, a virtual universal index may be created for each element, attribute, and/or data type involved in a particular query being optimized.

To enumerate candidate index patterns, the index advisor sends each query in a workload to the optimizer for optimization. Index patterns chosen by the optimizer for each query are then added to a set of candidate index patterns that will be considered while searching for an optimal index configuration for the XML data.

Generalizing Candidates

Candidate index patterns enumerated above are specific to individual queries as an optimizer identifies patterns specific to each query that could benefit from an index. The optimizer, however, may not be able to identify common patterns across queries. Common patterns can lead to more general indexes that can benefit multiple queries in a current workload and in future workloads.

To address this, candidate index patterns enumerated by the optimizer are expanded by applying a set of generalization rules that create more general candidate index patterns useful to multiple queries from the candidate index patterns that are specific to individual queries. For example, as shown in table 500 of FIG. 5, path expressions "/Security/Symbol" and "/Security/SecInfo/Sector" are identified by the optimizer as candidates for indexing. Based on these two path expressions, an additional and more general candidate path expression "/Security//*" can be generated.

The additional candidate path expression covers the original two candidate path expressions as well as other path expressions that could potentially exist in the XML data, such as "/Security//Industry". The index advisor can recommend the additional candidate path expression as an alternative to or in addition to the two original candidate path expressions. Although the new candidate may have a size that is greater than the total size of the two original candidates as it covers more paths, it can potentially be useful for queries beyond those that are covered by the other two.

Generalization of candidate path expressions can be done in pairs or one candidate at a time. To generalize a candidate path expression, the path expression may be represented as an expression tree, such as an XPS tree (XPath Step tree). An XPS tree is composed of labeled nodes. Each node is labeled with its navigation axis and its node test, where the navigation axis is the special axis root or one of: child, descendant, or attribute. The test can be either a name test or a wildcard test.

Each node can have two children, the left child represents any predicate on the node, while the right child represents a next step in the expression. FIG. 6 shows an example of an expression tree 600 representing a path expression. Expression tree 600 in an XPS tree. In the example, the node 'Security' has both an equality predicate child and a next step child. Path expressions may contain both navigational and predicate branching. Navigation can contain label wildcards, "*", child axis navigation, "/", and descendant navigation, "//". Predicates can involve comparison operators <, ≤, >, ≥, =, #, lt, le, ge, gt, eq, ne, and so forth. Tree representation can be obtained by parsing path expressions. After generalization, a generalized tree can be traversed to obtain a corresponding path expression.

Generalizing Pairs of Candidates

Generalized candidate path expressions can be found by iteratively applying several generalization rules to each pair of candidate path expressions enumerated for specific queries and to resulting generalized candidate path expressions. This process may continue until no new generalized path expressions can be generated. The rules consider two path expressions concurrently and try to find common path nodes between the two paths and capture the commonality in a new generalized path expression(s). The new generalized path expression(s) are then added to candidate path expressions already enumerated.

Set forth below is pseudo-code for an algorithm that can be used to find more generalized candidates from pairs of existing candidates according to an implementation of the invention. The algorithm is called 'generalizeXPworkload', which accepts as input XPset.

```
start ← 0
end ← XPset.size
while no more new paths are generalized do
    for i = start to end − 1 do
        for j = i + 1 to end do
            if p_i and p_j have same data type and defined on same table
            then
                genXPath ← generalizeStep(null, p_i, p_j)
            end if
            if genXPath ∉ XPset then
                add new path to XPset
            end if
        end for
    end for
    start ← end + 1
    end ← end + number of new generated paths
end while
```

In the 'generalizeXPworkload' algorithm, data type, table name, and column name of the pairs are checked for compatibility. Data type, however, may not be checked for path expressions to be used to create structural indexes. After checking data type, table name, and column name, another algorithm called 'generalizedStep' is called for every qualifying pair. The 'generalizedStep' algorithm applies generalization rules to a pair of path expressions to find all common sub-expressions. Variable $p_i$ is used to refer to the root of a subtree in a path expression currently being generalized and variable genXPath is used to refer to an expression tree of a generalized path expression being generated.

During generalization of a pair of path expressions, paths are divided into two parts: a last step that represents nodes being indexed and a path leading to the last step. In the generalization, whenever a predicate occurs in the middle of a path expression, it is generalized to include all nodes, not just the ones qualified by the predicate. For example, generalization of the path expression '/Security[Symbol="BCIIP RC"]//Sector' with any other path expression will be handled the same as '/Security//Sector', since all nodes of '/Security//Sector' are included when generalizing, not just the qualified ones.

Below is pseudo-code for the 'generalizedStep' algorithm according to an implementation of the invention. The 'generalizedStep' algorithm accepts as input genXPath, $p_1$, $p_2$.

```
if p_1.nameTest = p_2.nameTest then
    create newNode with p_1.nameTest and gAxis(p_1.axis, p_2.axis)
    append newNode to genXPath
    return {generalizeComp(genXPath, p_1, p_2)}
else
    create newNode with wildcard test and gAxis (p_1.axis, p_2.axis)
    append newNode to genXPath
    return {generalizeComp(genXPath, p_1, p_2)}
end if
```

As seen above, generalization of path expressions is divided into the 'generalizedStep' algorithm and a 'generalizedComp' algorithm. Each algorithm returns lists of genXPaths. The 'generalizedStep' algorithm takes two expression trees, generalizes the roots of these trees, and appends the new generalized node to the genXPath expression.

For root nodes $f_1$ and $f_2$ of trees $p_1$ and $p_2$, root nodes $f_1$ and $f_2$ are checked to see whether they have the same axis and name test information. If so, the newly generated node retains the same axis and name test information as $f_1$ and $f_2$. If not, a generalized form for the axis and found and the name test is replaced with a wildcard label. The new node is then appended to the genXPath tree currently being generated and passed along with $p_1$ and $p_2$ to the 'generalizedComp' algorithm to process the rest of the expressions. The list of generated trees returned from the 'generalizedComp' algorithm is passed back to the 'generalizeXPworkload' algorithm to be appended to list of candidates.

The 'generalizeComp' algorithm plays the role of traversing the trees by advancing the tree pointers of $p_1$ and $p_2$ according to a set of rules. Depicted in FIG. 7 is a table 700 with a set of rules used by the 'generalizedComp' algorithm according to an implementation of the invention. The set of rules are designed to generate candidates that are as general as possible. In some cases, several choices may be considered in parallel, and hence more than one genXPath may be found and a list of all of these genXPaths is returned.

In one implementation, to generalize a pair of XPS trees, begin at root nodes of both trees and proceed by advancing their pointers. At each step, attempt is made to generalize the nodes currently being processed. For example, to generalize candidates C1: /Security/Symbol and C2: /Security/SecInfo/*/Sector from table 500 in FIG. 5, an initial call is made to generalizedStep(null, /Security/Symbol, /Security/SecInfo/*/Sector). The 'generalizedStep' algorithm looks at the nodes /Security in both paths and recognizes that they have the same name tests, therefore it creates a node with a /Security name test and appends it to a genXPath being produced. It then calls generalizedComp(/Security, /Security/Symbol, /Security/SecInfo/*/Sector) to complete processing these expressions.

In this call, Rule 4 in table 700 in FIG. 7 applies, and the pointer of the second expression is advanced until /Sector is reached. Then generalizedStep (/Security/*, /Symbol, //Sector) is called. As nodes /Symbol and /Sector have different name tests, a new node with a wildcard name test is appended to the genXPath. This time when generalizedComp(/Security/*/*, /Symbol, /Sector) is called, Rule 1 in table 700 is applied and the expression /Security//* is returned after processing the consecutive wildcard nodes. Finally, the list of candidates in table 500 can be extended to include candidate C4 in a table 800 illustrated in FIG. 8.

If nodes reoccur multiple times in the path expressions being processed, multiple generalized trees can be generated. For example, running the generalization algorithm on two expressions /a/b/c/@d and /c/a/b/@d, Rule 5 in table 700 will be applied and more than one common sub-expression may be found for the two expressions. Hence, two new expressions will be returned to be added to the candidate set: //a/b//@d and //c//@d.

For every genXPath, the candidate index patterns that were combined to produce it are tracked. The generalization step can also be used to check if a candidate path expression is a generalization of another. If the generalization of a pair of path expressions $p_1$ and $p_2$ is equal to one of them, say $p_1$, then $p_1$ is a generalization of $p_2$, then the fact that queries that benefit from $p_2$ will also benefit from $p_1$ can be recorded.

Generalizing Individual Candidates

Some path expressions might not be generalized with any other path expression. An example of this is candidate C3 in table 500 of FIG. 5. To get more general candidates even from individual candidate path expressions with no common sub-expressions, a technique that predicts the existence of other expressions similar to a candidate can be used. In one implementation, the technique replaces a last non-* navigation step in a candidate path expression with a * navigation step. For example, the path C3 in table 500 can be generalized into /Security/*. A more comprehensive approach may consult the data to determine the usefulness of such a generalization and recommend other generalizations.

Estimating Benefits

An optimizer can be used by an index advisor to estimate the benefit to a workload of having a particular index configuration. Virtual indexes can be created using candidate path expressions and used to estimate the cost of a workload with the virtual indexes in place. These virtual indexes can be included with other existing real indexes when performing index matching to find candidate indexes and when determining an execution plan for a query. After optimizing a query using virtual indexes, the optimizer returns a set of indexes used along with statistics and cost information. The information is used by the index advisor to determine the benefit of using an index or a configuration consisting of multiple indexes.

Statistics Generation

While finding an execution plan in the presence of one or more virtual indexes, the optimizer will need statistics about these virtual indexes to get better cost estimates. Some of these statistics are data statistics, such as the distinct path expressions being indexed and their frequencies, while others are index statistics, such as a number of disk pages occupied by the index. All the necessary data statistics may be collected using an optimizer's normal (i.e., non-virtual) statistics collection command(s). Data statistics can then be used to estimate the index statistics for the virtual indexes.

A B-tree index may be used for XML indexing. When a B-tree index is used, the optimizer requires two statistics for an XML index: its cardinality and its size on disk. The cardinality, or total number of entries of an index, is a total number of XML nodes in the XML data that match a particular index pattern. Data statistics can be used to estimate a number of nodes that match the particular index pattern. For example, if the frequencies of two paths /a/b and /a/c are $n_1$ and $n_2$, the cardinality of an index whose pattern is /a/* can be estimated by adding $n_1$ and $n_2$.

Data statistics, such as the size of an index key and the number of keys, can also be used to estimate the size of an index. Multiplying the size of an index key by the number of keys gives an estimate of a total size of an index. With the cardinality and index size statistics of a virtual index in place, the virtual index can be used for cost estimation like any real index.

Update, Delete, and Insert Costing

To evaluate the benefit of an index for a given workload, the cost of queries in the workload when the index is available is subtracted from the cost of the queries when the index is not present. The difference represents a reduction in cost or benefit of using this index for this workload. Workloads may contain update, delete, and insert (UDI) statements in addition to queries. Any index recommended must be maintained for each of the UDI statements in the workload. At the same time, update and delete statements may benefit from an index that helps them identify nodes that need to be updated or deleted.

The benefit of having an index for UDI statements is estimated just like the benefit of indexes for queries. However, maintenance costs of indexes under UDI statements will also need to be estimated. To estimate the maintenance cost of UDI statements, data statistics can be used to estimate how many XML nodes the statement will affect. An assumption can be made that all the index nodes corresponding to these XML nodes will need to be updated. The estimated number will be used along with information about how the index is implemented to estimate the maintenance cost for this index. This maintenance cost is subtracted from the index benefit.

Index Interaction

To evaluate the benefit of a configuration consisting of multiple indexes, the benefit of the individual indexes can be estimated independently and then added up. This approach, however, ignores the interaction between indexes. In particular the benefit of an index will change depending on what other indexes are available because an optimizer can use multiple indexes in its plans. A simplistic approach to take index interaction into account is to evaluate an entire workload with all of the indexes in the configuration created as virtual indexes.

Two indexes can interact with one another if one or more of the following rules apply to the indexes:

Indexes $x_1$ and $x_2$ can be used in the same query. Keeping track of which queries can benefit from which indexes will enable this type of interaction to be detected Index $x_1$ can be used in the queries that recommended index $x_2$. Keeping track of this case will be useful when indexes are generalized Index $x_1$ was generated by generalizing index $x_2$. As a result, the optimizer can choose only one of them for any query that can benefit from these indexed nodes. This information may also available after the index generalization To estimate the benefit of a configuration of indexes, indexes in the configuration can be divided into smaller sub-configurations, where each sub-configuration includes indexes that may interact with each other according to the index interaction rules set forth above. Initially, a sub-configuration is created for each index in the configuration. The index interaction rules can be used to iteratively merge the sub-configurations that have indexes interacting with each other.

Keeping track of the queries that can use the indexes in each sub-configuration will reduce the number of optimizer calls that will be needed when the index configuration changes. When the configuration changes, only queries that can benefit from those sub-configurations that have changed will be evaluated, which allow index interaction to be taken into account without exhaustively re-evaluating the workload at each step of the search.

After candidate enumeration and generalization, an expanded set of candidate indexes will need to be searched to find an optimal index configuration (e.g., maximum benefit) for a given workload, XML data, and system constraints. This combinatorial search problem can be modeled as a 0/1 knapsack problem, which is NP-complete. The size of the knapsack is, for example, a total disk space budget specified by a user. Each candidate index, which is an "item" that can be placed in the knapsack, has a cost (e.g., estimated size), and also has a benefit (e.g., reduction in estimated workload execution time due to the presence of this index).

The problem is further complicated by the fact that indexes interact with one another as the benefit of an index for a query can change depending on whether or not other indexes exist. One approach to solving the 0/1 knapsack problem is to use a greedy search that ignores index interaction. To take index interaction into account, some heuristics can be added to the greedy search to ensure that only indexes with maximum benefit that can be used independently are selected.

A top down search that chooses as many general indexes as can fit into the disk budget can also be used to solve the 0/1 knapsack problem. The goals of the greedy search with heuristics and the top down search are fundamentally different. The greedy search with heuristics attempts to find the best possible set of indexes for a given workload, without any consideration for the generality of these indexes, while the top down search attempts to find configurations that are as general as possible so that they can benefit not only the given workload but also any similar future workloads. The two approaches are described in further detail below.

Greedy Search with Heuristics

With the greedy approximation of the NP-complete 0/1 knapsack problem, the size of each candidate index and a total benefit of each candidate index for a given workload are estimated. The candidate indexes are then sorted according to their benefit/size ratio. Finally, candidates are added to the output configuration in sorted order of benefit/size ratio, starting with the highest ratio, and continue until an available disk space budget is exhausted. As this is an approximate solution, the approach can be improved by skipping candidates that do not fit into the available disk space budget and continuing to add other candidates that can fit into the budget, trying to accommodate as many indexes as possible.

One potential drawback of the greedy search is that multiple indexes that have been selected can be used to answer the same predicate. Unfortunately, an optimizer can use only one of the indexes in its plan. One possible solution to this problem is to compile all queries of a workload after the indexes in the configuration have been selected, and then eliminate indexes that are never used. A problem with this solution is that the extra disk space that is freed will never be used to add more indexes, even though the space could be very useful.

For example, if indexes $x_1, x_2, \ldots, x_n$ are generalized to index $x_{general}$, then an expanded set of candidate indexes searched will include all the $x_i$'s and the $x_{general}$. Because of the high benefit of $x_{general}$, it is possible that $x_{general}$ will be selected by the greedy search before other $x_i$'s. The problem occurs when there is enough space to accommodate all the $x_i$ indexes. If unused indexes are eliminated after index recommendation, either the $x_i$ indexes or the $x_{general}$ index will be eliminated, which will free space that will never be used.

One solution to this problem is to add one more objective to the candidates search problem: maximizing a number of workload path expressions that use indexes in the selected configuration, or minimizing overlap between the selected indexes. Maximizing the workload benefit remains the primary objective of the search, and heuristics are added to attempt to enforce the new objective in a best effort manner.

This new search algorithm adopts the same procedure of the greedy solution described above, but before adding any general index to a configuration, heuristic rules are applied to make sure that the index will not be a replication of others already chosen. When a general index, $x_{general}$, is added to the recommended index configuration, it must be "better" than the indexes it generalizes, $x_1, x_2, \ldots, x_n$. This is represented in the following two heuristic conditions, which must be satisfied before the general index is added:

$$\text{Benefit}(x_{general}) \geq \text{Benefit}(x_1, x_2, \ldots, x_n)$$

$$\text{Size}(x_{general}) \leq (1 + \beta) \sum_{i=1}^{n} \text{Size}(x_i)$$

Most of the time, general indexes are larger than specific indexes because they contain more nodes from the data. The second heuristic restricts the expansion in size that is allowed when a general index is chosen. The first heuristic ensures that the general index is at least as good as the specific indexes. Hence, the approach is biased towards choosing the smallest configuration that is best for the current workload.

Top Down Search

The greedy search with heuristics recommends the best configuration that fits the specific given workload. Because of that, it can be viewed as over-training for the given workload. If the workload changes even slightly, the recommended configuration may not be of any use. This is acceptable if a database administrator (DBA) knows that the workload will not change at all. For example, if the workload is all the queries in a particular application.

However, another likely scenario is that the DBA has assembled a representative training workload, but that the actual workload may be a variation on this training workload. This is often true for relational data, but it is of added importance for XML, because the rich structure of XML allows users to pose queries that retrieve different paths of the data with slight variations. If this is the case, and the workload presented to the design advisor is a representative of a larger class of possible workloads, then the goal of the design advisor should be to choose a set of indexes that is as general as possible, while still benefiting the workload queries. A top down search algorithm can be used to achieve this goal.

In one implementation, a Directed Acyclic Graph (DAG) of candidate indexes is constructed. Each node in the DAG represents an XML pattern and will have as its parents its possible generalization patterns, based on candidate generalization. For example, when generalizing the two candidates /Security/Symbol and /Security/SecInfo/*/Sector to get /Security//*, a node will be created in the DAG for /Security//*, and this node will be a parent of the two candidates.

At the end of this construction phase, there will be a DAG rooted at the most general indexes that can be obtained from the workload. The roots of the DAG are a starting configuration. Since general indexes are typically large in size, the starting configuration is likely to exceed the available disk space budget. Thus, a general index from the configuration is iteratively replaced with its specific (and smaller) child indexes until the configuration fits within a disk budget.

To choose the general index to replace, two new metrics $\Delta B$ and $\Delta C$ are introduced. Assume that candidates $x_1, x_2, \ldots, x_n$ are generalized to a candidate $x_{general}$. There will be nodes in the DAG for each of these candidates, and $x_{general}$ will be a parent of $x_1, x_2, \ldots, x_n$. Metrics $\Delta B$ and $\Delta C$ are defined as follows:

$$\Delta B = \text{Benefit}(x_{general}) - \sum_{0 \leq i \leq n} \text{Benefit}(x_i)$$

-continued $$\Delta C = \text{Size}(x_{general}) - \sum_{0 \leq i \leq n} \text{Size}(x_i)$$

Since the goal is to obtain the maximum total benefit for the workload with the most general configuration that fits in the disk space budget, the general index with the smallest ΔB/ΔC ratio are iteratively selected and replaced with its (more specific) children in the DAG. Pseudo-code for an algorithm that accomplishes this in accordance with an implementation of the invention is set forth below. The algorithm is named topDownSearch and accepts as input a variable basicCandidates. In one implementation, if all general statistics have been considered and all of the disk budget has not been used up, then a greedy search may be used instead. In this case, heuristics need not be applied because none of the indexes being searched is general.

```
candidates ← basicCandidates
currSize ← candidates.size
while currSize > diskConstraint do
    for cand = 1 to candidates.num do
        calculate ΔB/ΔC of cand
    end for
    candidates ← configuration after replacing candidate whose (ΔB/ΔC)
        is minimum with its children
    currSize ← candidates.size
end while
```

The invention can take the form of an entirely hardware implementation, an entirely software implementation, or an implementation containing both hardware and software elements. In one aspect, the invention is implemented in software, which includes, but is not limited to, application software, firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include DVD, compact disk—read-only memory (CD-ROM), and compact disk—read/write (CD-RAN).

Figure 9:
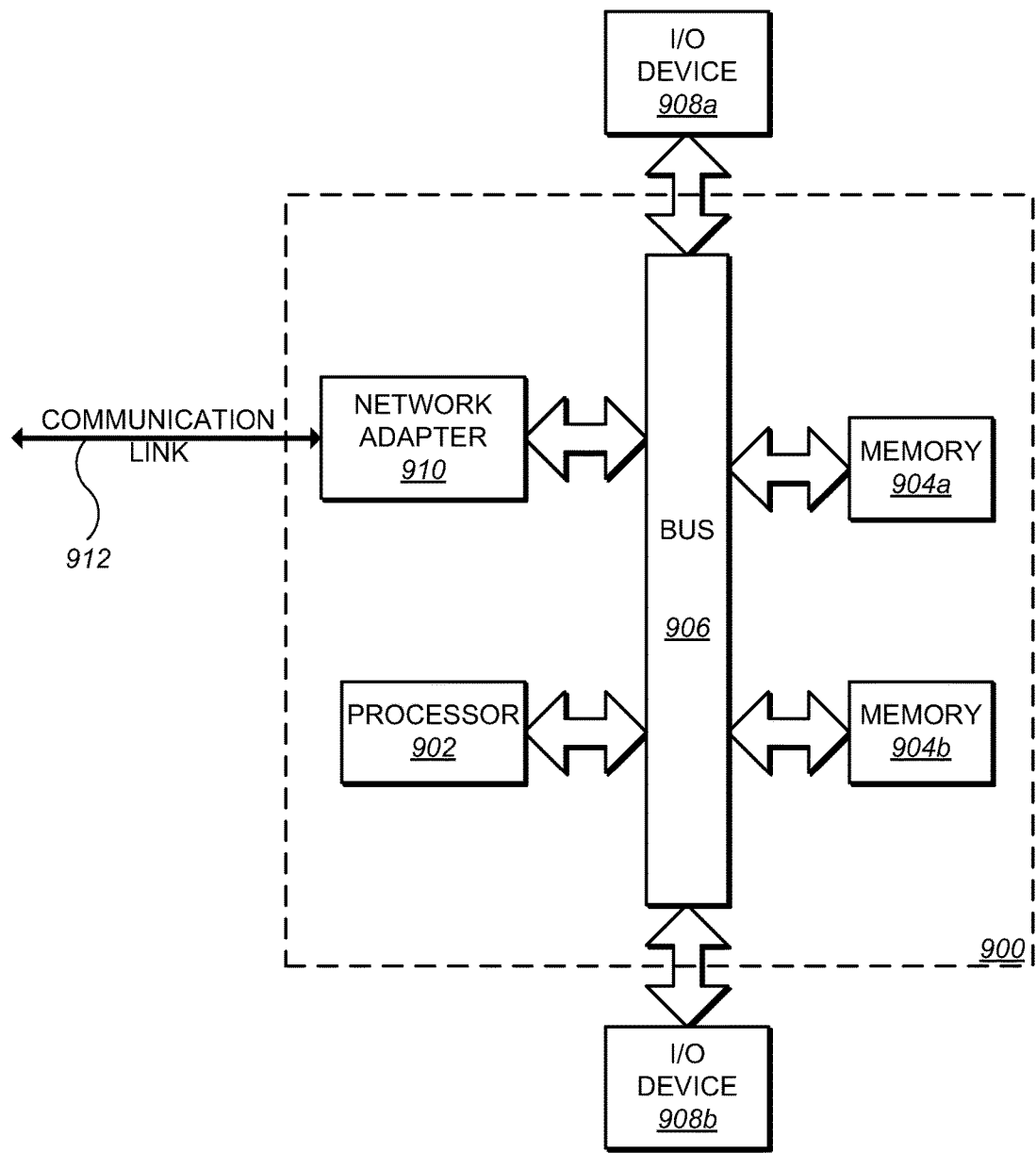
FIG. 9 shows a block diagram of a data processing system with which implementations of the invention can be implemented.

FIG. 9 depicts a data processing system 900 suitable for storing and/or executing program code. Data processing system 900 includes a processor 902 coupled to memory elements 904a-b through a system bus 906. In other implementations, data processing system 900 may include more than one processor and each processor may be coupled directly or indirectly to one or more memory elements through a system bus.

Memory elements 904a-b can include local memory employed during actual execution of the program code, bulk storage, and cache memories that provide temporary storage of at least some program code in order to reduce the number of times the code must be retrieved from bulk storage during execution. As shown, input/output or I/O devices 908a-b (including, but not limited to, keyboards, displays, pointing devices, etc.) are coupled to data processing system 900. I/O devices 908a-b may be coupled to data processing system 900 directly or indirectly through intervening I/O controllers (not shown).

In the implementation, a network adapter 910 is coupled to data processing system 900 to enable data processing system 900 to become coupled to other data processing systems or remote printers or storage devices through communication link 912. Communication link 912 can be a private or public network. Modems, cable modems, and Ethernet cards are just a few of the currently available types of network adapters.

While various implementations for selecting XML indexes have been described, the technical scope of the present invention is not limited thereto. For example, the present invention is described in terms of particular systems having certain components and particular methods having certain steps in a certain order. One of ordinary skill in the art, however, will readily recognize that the methods described herein can, for instance, include additional steps and/or be in a different order, and that the systems described herein can, for instance, include additional or substitute components. Hence, various modifications or improvements can be added to the above implementations and those modifications or improvements fall within the technical scope of the present invention.

What is claimed is:

1. A method for creating indexes over XML data managed by a database system, the method comprising:
   receiving a workload for the XML data, the workload including one or more database statements;
   utilizing an optimizer of the database system to enumerate a set of one or more candidate path expressions by creating virtual universal indexes for an element, an attribute, and a data type in the XML data and matching a path expression to one of the virtual universal indexes; and
   recommending one or more path expressions from the set of one or more candidate path expressions to create the indexes over the XML data based on a system constraint, an estimated benefit associated with each candidate path expression, and an estimated size of an index to be created using each candidate path expression.

2. The method of claim 1, further comprising:
   generalizing the set of one or more candidate path expressions to generate additional candidate path expressions;
   utilizing the optimizer to estimate the benefit associated with each candidate path expression in relation to the workload received; and
   utilizing the optimizer to estimate a size of an index to be created using each candidate path expression.

3. The method of claim 1, wherein utilizing the optimizer to enumerate the set of one or more candidate path expressions comprises:
   sending each of the one or more database statements of the workload to the optimizer for the optimizer to:
   create one or more virtual universal indexes based upon one or more path expressions over the XML data, a virtual universal index being created for each data type, element, and attribute in the database statement being processed, match one or more path expressions in the database statement being processed to the one or more virtual universal indexes, and enumerate each of the one or more path expressions matched as the set of one or more candidate path expressions.

4. The method of claim 2, wherein generalizing the set of one or more candidate path expressions comprises:

selecting a first candidate path expression and a second candidate path expression;

determining whether the first candidate path expression and the second candidate path expression have one or more common sub-expressions;

responsive to the first candidate path expression and the second candidate path expression having one or more common sub-expressions, returning each of the one or more common sub-expressions as an additional candidate path expression; and responsive to the first candidate path expression and the second candidate path expression not having one or more common sub-expressions, modifying each of the first and second candidate path expressions by replacing a last non-* navigating step in each of the first and second candidate path expressions with a *navigation step, and returning the modified first and second candidate path expressions as the additional candidate path expressions.

5. The method of claim 1, wherein utilizing the optimizer to estimate the benefit associated with each candidate path expression comprises:

sending each candidate path expression to the optimizer for the optimizer to:

estimate a cardinality and a size of an index created over the XML data using the candidate path expression, calculate a cost of executing the one or more database statements in the workload when the index is available (a first cost), calculate a cost of executing the one or more database statements in the workload when the index is not available (a second cost), calculate a cost of maintaining the index with respect to an update, a deletion, or an insertion (a third cost), and subtract from the second cost a sum of the first cost and the third cost to obtain the estimated benefit associated with the candidate path expression.

6. The method of claim 1, wherein recommending one or more path expressions from the set of one or more candidate path expressions comprises:

sorting the set of one or more candidate path expressions according to a benefit-to-size ratio from highest to lowest; and starting from a highest benefit-to-size ratio candidate path expression, adding a candidate path expression to the set of one or more candidate path expressions in sort order, unless an index to be created using the candidate path expression will not fit into an available disk budget, and until one or more indexes to be created using the set of one or more candidate path expressions will exhaust the available disk budget.

7. The method of claim 1, wherein recommending one or more path expressions from the set of one or more candidate path expressions comprises:

constructing a directed acyclic graph (DAG) using the set of one or more candidate path expressions, each node of the DAG corresponding to one candidate path expression;

selecting one or more nodes of the DAG, wherein candidate path expressions corresponding to the one or more nodes selected are included in the one or more path expressions;

iteratively replacing at least one of the one or more nodes selected with one or more child nodes until one or more indexes to be created using the one or more path expressions corresponding to the one or more child nodes will fit within an available disk budget; and replacing each candidate path expression included in the set of one or more candidate path expressions corresponding to the at least one of the one or more nodes with the one or more path expressions corresponding to the one or more child nodes replacing the at least one of the one or more nodes.

8. A computer-implemented system for creating indexes over XML data managed by a database system, the system comprising:

a processor;

a database storing the XML data;

an optimizer in communication with the database, the optimizer optimizing database statements seeking access to the XML data stored in the database; and an index advisor in communication with the optimizer, wherein the index advisor:

receives a workload for the XML data, the workload including one or more database statements;

utilizes an optimizer of the database system to enumerate a set of one or more candidate path expressions by creating virtual universal indexes for an element, an attribute, and a data type in the XML data and matching a path expression to one of the virtual universal indexes; and recommends one or more path expressions from the set of one or more candidate path expressions to create the indexes over the XML data based on a system constraint, an estimated benefit associated with each candidate path expression, and an estimated size of an index to be created using each candidate path expression.

9. The computer-implemented system of claim 8, further wherein the index advisor:

generalizes the set of one or more candidate path expressions to generate additional candidate path expressions;

utilizes the optimizer to estimate the benefit associated with each candidate path expression in relation to the workload received; and utilizes the optimizer to estimate a size of an index to be created using each candidate path expression.

10. The computer-implemented system of claim 8, wherein the index advisor utilizes the optimizer of the database system to enumerate the set of one or more candidate path expressions by:

sending each of the one or more database statements of the workload to the optimizer for the optimizer to:

create one or more virtual universal indexes based upon one or more path expressions over the XML data, a virtual universal index being created for each data type, element, and attribute in the database statement being processed, match one or more path expressions in the database statement being processed to the one or more virtual universal indexes, and enumerate each of the one or more path expressions matched as the set of one or more candidate path expressions.

11. The computer-implemented system of claim 9, wherein the index advisor generalizes the set of one or more candidate path expressions by:
    selecting a first candidate path expression and a second candidate path expression;
    determining whether the first candidate path expression and the second candidate path expression have one or more common sub-expressions;
    responsive to the first candidate path expression and the second candidate path expression having one or more common sub-expressions, returning each of the one or more common sub-expressions as an additional candidate path expression; and
    responsive to the first candidate path expression and the second candidate path expression not having one or more common sub-expressions,
    modifying each of the first and second candidate path expressions by replacing a last non-* navigating step in each of the first and second candidate path expressions with a * navigation step, and
    returning the modified first and second candidate path expressions as the additional candidate path expressions.

12. The computer-implemented system of claim 8, wherein the index advisor utilizes the optimizer to estimate the benefit associated with each candidate path expression by:
    sending each candidate path expression to the optimizer for the optimizer to:
    estimate a cardinality and a size of an index created over the XML data using the candidate path expression,
    calculate a cost of executing the one or more database statements in the workload when the index is available (a first cost),
    calculate a cost of executing the one or more database statements in the workload when the index is not available (a second cost),
    calculate a cost of maintaining the index with respect to an update, a deletion, or an insertion (a third cost), and
    subtract from the second cost a sum of the first cost and the third cost to obtain the estimated benefit associated with the candidate path expression.

13. The computer-implemented system of claim 8, wherein the index advisor recommends one or more path expressions from the set of one or more candidate path expressions by:
    sorting the set of one or more candidate path expressions according to a benefit-to-size ratio from highest to lowest; and
    starting from a highest benefit-to-size ratio candidate path expression, adding a candidate path expression to the set of one or more candidate path expressions in sort order,
    unless an index to be created using the candidate path expression will not fit into an available disk budget, and
    until one or more indexes to be created using the set of one or more candidate path expressions will exhaust the available disk budget.

14. The computer-implemented system of claim 8, wherein the index advisor recommends one or more path expressions from the set of one or more candidate path expressions by:
    constructing a directed acyclic graph (DAG) using the set of one or more candidate path expressions, each node of the DAG corresponding to one candidate path expression;
    selecting one or more nodes of the DAG, wherein candidate path expressions corresponding to the one or more nodes selected are included in the one or more path expressions;
    iteratively replacing at least one of the one or more nodes selected with one or more child nodes until one or more indexes to be created using the one or more path expressions corresponding to the one or more child nodes will fit within an available disk budget; and
    replacing each candidate path expression included in the set of one or more candidate path expressions corresponding to the at least one of the one or more nodes with the one or more path expressions corresponding to the one or more child nodes replacing the at least one of the one or more nodes.

15. A computer program product comprising a non-transitory computer-readable medium, the computer-readable medium being encoded with a computer program for creating indexes over XML data managed by a database system, wherein the computer program, when executed on a computer, causes the computer to:
    receive a workload for the XML data, the workload including one or more database statements;
    utilize an optimizer of the database system to enumerate a set of one or more candidate path expressions by creating v virtual universal indexes for an element, an attribute, and a data type in the XML data and matching a path expression to one of the virtual universal indexes; and
    recommend one or more path expressions from the set of one or more candidate path expressions to create the indexes over the XML data based on a system constraint, an estimated benefit associated with each candidate path expression, and an estimated size of an index to be created using each candidate path expression.

16. The computer program product of claim 15, further wherein the computer program, when executed on the computer, causes the computer to:
    generalize the set of one or more candidate path expressions to generate additional candidate path expressions;
    utilize the optimizer to estimate the benefit associated with each candidate path expression in relation to the workload received; and
    utilize the optimizer to estimate a size of an index to be created using each candidate path expression.

17. The computer program product of claim 16, wherein generalization of the set of one or more candidate path expressions comprises:
    selecting a first candidate path expression and a second candidate path expression;
    determining whether the first candidate path expression and the second candidate path expression have one or more common sub-expressions;
    responsive to the first candidate path expression and the second candidate path expression having one or more common sub-expressions, returning each of the one or more common sub-expressions as an additional candidate path expression; and
    responsive to the first candidate path expression and the second candidate path expression not having one or more common sub-expressions, modifying each of the first and second candidate path expressions by replacing a last non-* navigating step in each of the first and second candidate path expressions with a * navigation step, and returning the modified first and second candidate path expressions as the additional candidate path expressions.

18. The computer program product of claim 15, wherein utilization of the optimizer to estimate the benefit associated with each candidate path expression comprises:

sending each candidate path expression to the optimizer for the optimizer to:

estimate a cardinality and a size of an index created over the XML data using the candidate path expression, calculate a cost of executing the one or more database statements in the workload when the index is available (a first cost), calculate a cost of executing the one or more database statements in the workload when the index is not available (a second cost), calculate a cost of maintaining the index with respect to an update, a deletion, or an insertion (a third cost), and subtract from the second cost a sum of the first cost and the third cost to obtain the estimated benefit associated with the candidate path expression.

19. The computer program product of claim 15 wherein to recommend one or more path expressions from the set of one or more candidate path expressions comprises:

sorting the set of one or more candidate path expressions according to a benefit-to-size ratio from highest to lowest; and starting from a highest benefit-to-size ratio candidate path expression, adding a candidate path expression to the set of one or more candidate path expressions in sort order, unless an index to be created using the candidate path expression will not fit into an available disk budget, and until one or more indexes to be created using the set of one or more candidate path expressions will exhaust the available disk budget.

20. The computer program product of claim 15, wherein to recommend one or more path expressions from the set of one or more candidate path expressions comprises:

constructing a directed acyclic graph (DAG) using the set of one or more candidate path expressions, each node of the DAG corresponding to one candidate path expression;

selecting one or more nodes of the DAG, wherein candidate path expressions corresponding to the one or more nodes selected are included in the one or more path expressions;

iteratively replacing at least one of the one or more nodes selected with one or more child nodes until one or more indexes to be created using the one or more path expressions corresponding to the one or more child nodes will fit within an available disk budget; and replacing each candidate path expression included in the set of one or more candidate path expressions corresponding to the at least one of the one or more nodes with the one or more path expressions corresponding to the one or more child nodes replacing the at least one of the one or more nodes.

* * * * *